United States Patent Office 2,709,711
Patented May 31, 1955

2,709,711

SYNTHESIS OF CAROTENOID POLYENES

Charles D. Robeson and John D. Cawley, Rochester, N. Y., assignors to Eastman Kodak Company, Rochester, N. Y., a corporation of New Jersey No Drawing. Application April 22, 1950,
Serial No. 157,624

6 Claims. (Cl. 260—617)

This invention relates to the synthesis of carotenoid polyene compounds and is particularly concerned with methods of synthesizing carotenoid polyene compounds having vitamin A activity and intermediate products formed thereby.

Vitamin A-active materials are characterized by the functional carotenoid polyene group of the structure $$\text{ring}\begin{matrix}H_3C & CH_3\\ & \\ & CH_3\end{matrix}-CH=CH-\underset{CH_3}{\overset{\;}{C}}=CH-CH=CH-\underset{CH_3}{\overset{\;}{C}}=CH-$$

and typical vitamin A-active materials include vitamin A acids, esters, ethers and alcohols having this functional group. The complex character of this conjugated polyene system has made the synthesis of vitamin A a difficult procedure. The synthesis of such conjugated polyenes is further complicated by the inherent instability of these materials with a resultant tendency towards objectionable decomposition of materials and undesirable side reactions.

It is accordingly an object of this invention to provide a new and useful method of synthesizing carotenoid polyene material.

It is a further object of the invention to provide a method of synthesizing vitamin A-active material in good yield.

Another object of the invention is to synthesize vitamin A-active material by a method which minimizes objectionable decomposition and undesirable side reactions during the synthesis.

Another object of the invention is to provide a new combination of method steps forming a commercially feasible method of synthesizing vitamin A.

Another object of the invention is to minimize the number of inherently unstable intermediates employed in the synthesis of vitamin A-active material.

Another object of the invention is to provide a method of synthesizing vitamin A by a series of straight-forward chemical steps which are operable on a plant scale.

Another object of the invention is to simplify the synthesis of vitamin A and thereby provide an economically feasible method of increasing the available supply of vitamin A.

Another object of the invention is to provide a new method of converting ionylic compounds to vitamin A-active materials.

Another object of the invention is to provide new compounds useful in the synthesis of vitamin A-active material.

Another object of the invention is to provide an improved method of increasing the chain length of $\beta$-ionylidene acetaldehyde.

Another object of the invention is to provide an improved synthesis of vitamin A-active material from readily available chemical materials.

Other objects will be apparent from the description and claims which follow.

These and other objects are attained by means of this invention as described more fully hereinafter and as defined in the appended claims.

$\beta$-Ionone has the structure $$R-CH=CH-\underset{CH_3}{\overset{\;}{C}}=O$$

wherein R is a 2,6,6-trimethyl cyclohexenyl radical. The ring unsaturation in $\beta$-ionone is conjugated with the side chain unsaturation as in vitamin A materials. In a preferred method of synthesizing vitamin A employing $\beta$-ionone as a starting material, the chain length of $\beta$-ionone is increased by converting $\beta$-ionone to $\beta$-ionylidene acetaldehyde. This conversion is effected in a preferred method by first converting $\beta$-ionone to $\beta$-ionylidene acetic acid ester, reducing the ester to $\beta$-ionylidene ethanol, and oxidizing the $\beta$-ionylidine ethanol to $\beta$-ionylidene acetaldehyde. Reference is made to the copending applications of Robeson, Serial No.157,621 and of Cawley and Robeson, Serial No. 157,626, both of which were filed concurrently herewith and disclose other related methods of converting $\beta$-ionylidene acetaldehyde to vitamin A alcohol.

In accordance with this invention, $\beta$-ionylidene acetaldehyde is then condensed with an ester of $\beta$-methyl glutaconic acid under conditions effective to form an $\alpha,\gamma$-dicarboxy condensation product corresponding in chemical composition to vitamin A diacid and having the structure $$\begin{matrix}H_3C & CH_3\\ & \\ & CH_3\end{matrix}-CH=CH-\underset{CH_3}{\overset{\;}{C}}=CH-CH=\underset{\;}{\overset{COOH}{C}}-\underset{CH_3}{\overset{\;}{C}}=CHCOOH$$

This condensation product is then decarboxylated to the corresponding $\alpha$-monocarboxy compound having the chemical composition of vitamin A acid. The monoacid product formed by decarboxylating the diacid will usually be composed, at least in part, of the cis isomer of vitamin A acid, vitamin A-active materials existing in both the cis and trans forms. It should be noted that natural vitamin A esters and vitamin A alcohol derived therefrom by saponification consist of a major proportion of the trans isomer and a minor proportion of the cis isomer. Both isomers exhibit vitamin A biological activity.

Vitamin A monoacid exhibits vitamin A biological activity but vitamin A-active material is desirably in the form of vitamin A alcohol or an ester of vitamin A alcohol. In a preferred embodiment of the invention, the monoacid formed as decarboxylation product is desirably converted to a vitamin A alcohol or an ester thereof. Vitamin A alcohol results from reduction of the carboxyl group of the monoacid, and in a preferred embodiment of the invention, the monoacid is esterfied before reduction. If an ester of vitamin A acid is desired, the monoacid is esterified and recovered without reduction. Vitamin A esters are desirably prepared, however, by reduction to vitamin A alcohol and esterification of the alcohol thus formed. It is sometimes desirable to obtain the vitamin A-active material predominantly in the trans form. Isomerizataion of at least a portion of the cis isomer to the trans isomer is readily effected with either the monoacid product formed by decarboxylation of the $\alpha,\gamma$-dicarboxy condensation product, the alcohol formed by reduction of the monoacid, or an ester of said alcohol. Isomerization can be effected by refluxing in an organic solvent but is desirably effected in the presence of an isomerization catalyst, materials such as acids, iodine, acid salts and similar materials being effective to catalyze such isomerization.

A preferred method of converting β-ionone to an ester of β-ionylidene acetic acid comprises reacting β-ionone with a haloacetate in the presence of a Reformatsky catalyst, hydrolyzing the reaction product to β-ionolacetic acid ester and dehydrating the β-ionolacetic acid ester to β-ionylidene acetic acid ester. Any of the haloacetates can be employed although the chloroacetates, bromacetates, and iodoacetates are preferred to the fluoracetates because of ease in handling. The alkyl haloacetates such as methyl, ethyl, propyl and similar alkyl haloacetates are conveniently employed in effecting the reaction although other aliphatic and aromatic haloacetates are entirely suitable. The reaction is carried out in the presence of a Reformatsky catalyst, that is, an active metal such as zinc or magnesium, whereby an organo-metal compound is formed as the initial reaction product. By hydrolysis in acid media, the reaction product is converted to the corresponding hydroxy ester, β-ionolacetic acid ester. The hydroxy ester is then dehydrated to the desired β-ionylidene acetic acid ester by heating or more preferably by treatment with a dehydration catalyst such as an acidic material or iodine and including materials such as phosphorous oxychloride, phosphorous trichloride, oxalyl chloride, mineral acids, other acid salts, acid clays, or similar well-known dehydration catalysts. Dehydration of the hydroxy ester, β-ionolacetic acid ester usually results in a mixture of the desired α,β-unsaturated β-ionylidene acetic acid ester and a β,γ-unsaturated isomer thereof. In order to increase the yield of the desired compound, it is desirable to isomerize at least a portion of the β,γ-unsaturated isomer to the desired α,β-unsaturated compound. When an acidic dehydration catalyst is employed, isomerization of the isomer to an equilibrium mixture with the desired α,β-unsaturated ester is effected by continuing the treatment with the catalyst substantially longer than necessary to effect dehydration. In the preferred procedure, the β,γ-unsaturated isomer is separated from the desired α,β-unsaturated ester and isomerized at least in part by treatment with a material having an acidic character under reaction conditions and including materials such as iodine, acids and acid salts and similar materials which act to catalyze isomerization, or is recycled and subjected to catalytic dehydration with additional hydroxy ester being dehydrated.

In the preferred method of converting β-ionone to β-ionylidene acetaldehyde, the β-ionylidene acetic acid ester is thereafter reduced to β-ionylidene ethanol. Reduction of the ester to the alcohol is desirably effected by use of an ether-soluble metal hydride, such as aluminum hydride, lithium aluminum hydride or lithium borohydride whereby the reduction is effected without otherwise affecting the unsaturation of the compound.

β-Ionylidene ethanol is then oxidized to β-ionylidene acetaldehyde. The oxidation is readily effected by treating β-ionylidene ethanol with finely divided manganese dioxide. Another effective method of effecting the oxidation comprises reacting together β-ionylidene ethanol, a ketone such as acetone or diethyl ketone, a primary aromatic amine such as aniline, and an alkoxide such as aluminum isopropoxide and hydrolyzing the product of such reacting to β-ionylidene acetaldehyde. The oxidation of an α,β-unsaturated alcohol such as β-ionylidene ethanol to an aldehyde such as β-ionylidene acetaldehyde by the latter method is described more fully in the co-pending application of Robeson and Eddinger, Serial No. 16,625, filed March 23, 1948, now United States Patent 2,507,647.

The β-ionylidene acetaldehyde thus formed by the conversion of β-ionone is thereafter condensed with an ester of β-methyl glutaconic acid to form an α,γ-dicarboxy condensation product. The condensation is readily effected by carrying out the reaction in the presence of a basic condensation catalyst whereby the catalyst promotes the condensation and usually at least partially saponifies the condensation product to the α,γ-dicarboxy condensation product. The condensation product is desirably subjected to further saponification following condensation in order to ensure substantially complete conversion of the reaction product to the diacid form.

In effecting the condensation, any ester of β-methyl glutaconic acid can be employed, the ester groups being split off by saponification and having no part in the remainder of the synthesis. Thus, the ester groups may be either aliphatic or aromatic; and preferably the β-methyl glutaconic acid is completely esterified. In the case of a full ester, the ester groups may be the same or different groups. Conveniently, the ester groups are the same and comprise alkyl groups such as the methyl, ethyl, propyl, butyl or similar alkyl esters. Aryl and aralkyl esters such as the phenyl or benzyl esters are also eminently suitable.

The condensation is desirably effected in the presence of a basic condensation catalyst, strong bases being preferably employed. Typical basic condensation catalysts suitable for use in practising the invention include the alkali metal hydroxides, alkoxides, ammonium hydroxide, substituted ammonium hydroxides, alkali metals, alkali metal hydrides, alkali metal amides and other well-known basic condensation catalysts. Examples of suitable basic condensation catalysts include sodium hydroxide, potassium hydroxide, sodium ethylate, sodium methylate, tetramethyl ammonium hydroxide, tetraethyl ammonium hydroxide, metallic sodium, sodium hydride, potassium hydride, sodamide, potassium amide, lithium amide and similar basic materials.

The condensation of β-ionylidene acetaldehyde and β-methyl glutaconate ester is conveniently carried out in solvent medium, the preferred solvents including alcohols, ethers, benzene, toluene and similar well-known solvents. When the basic catalytic material is one of the alkali metals, alkali metal hydrides, or amides, ether or benzene is desirably employed as solvent. Alcohols such as methanol, ethanol, propanol, isopropanol and the like are preferably employed with such basic catalysts as the hydroxides, alkoxides and quaternary ammonium hydroxides.

In order to ensure substantially complete recovery of the condensation product in the form of the α,γ-dicarboxy compound, the reaction product is desirably subjected to saponification, as for example by treatment with additional sodium or potassium hydroxide or other basic material, following condensation.

The α,γ-dicarboxy condensation product is thereafter converted to a vitamin A-active material by subjecting the condensation product to one or more of the reactions of decarboxylation, reduction isomerization, and esterification and including decarboxylation as the initial reaction. Complete decarboxylation of the α,γ-dicarboxy compound gives a polyene hydrocarbon. Desirably, the diacid is decarboxylated to the α-monocarboxy compound, corresponding chemically to vitamin A acid. Decarboxylation can be effected merely by heating the diacid, as for example by heating the diacid to a temperature above 100° C. When the α-monocarboxy compound is desired, however, the decarboxylation is preferably effected by heating in the presence of an organic base, preferably a tertiary amine, and a finely divided metal compound such as a metal, metal salt or metal oxide. Suitable organic bases include pyridine, quinoline, triethylamine and diethylaniline, although any of the well-known organic bases can be employed. Suitable metal catalysts include copper powder, copper-bronze powder, cuprous oxide, copper chromite, copper acetate, copper sulfate and copper oxide and similar copper salts. Particularly efficacious results are obtained in preparing the α-monocarboxy compound by employing a copper salt which is soluble in the organic base. Decarboxylation is preferably effected in the temperature range of about 90–175° C. although decarboxylation can be effected at temperatures lower than 90° C. as for example at temperatures as low as 60° or even lower or at temperatures higher than 175° C. as for example at temperatures as high as 200° C. or higher depending upon the reaction time employed. The time necessary to effect decarboxylation will, of course, depend upon the temperature employed and usually will vary between from about 15 minutes to about 3 hours although longer or shorter intervals can be employed.

In preparing the α-monocarboxy compound, the use of an organic base and metal catalyst gives optimum yields of the desired compound. It is desirable to carry out the decarboxylation under conditions such that only the monocarboxy compound is formed in admixture with the diacid, rather than employing more stringent conditions causing complete decarboxylation of a portion of the diacid. The monoacid is thereafter separated from the diacid and the diacid recycled for additional treatment. Alternatively the decarboxylation can be effected under controlled conditions whereby the reaction is carried out until the amount of carbon dioxide evolved gives a product having an average composition corresponding to the monoacid. The amount of carbon dioxide evolved is measured by pressure buildup, by titration or similar control procedure.

Decarboxylation of the condensation product, obtained by condensing β-ionylidene acetaldehyde and a β-methyl glutaconate ester, to the α-monocarboxy compound gives a vitamin A acid as a product. This monoacid can thereupon be reduced directly to vitamin A alcohol by treatment with an ether-soluble metal hydride such as aluminum hydride, lithium aluminum hydride or lithium borohydride. Desirably, however, the α-monocarboxy compound is esterified to the corresponding α-monocarboxy ester. Conventional esterification procedures can be employed. It is desirable, however, that the esterification be effected without shifting the unsaturation of the compound being esterified. It has been found that esterification can be effected without substantial isomerization as regards unsaturation by treating the monoacid in methyl ethyl ketone with an alkyl halide in the presence of an alkali carbonate and desirably in the presence of an alkali metal halide. Under these conditions, diacid in admixture with the monoacid does not esterify and the diacid is readily separated from the monoacid, as for example by chromatography, solvent extraction, fractional crystallization or similar separation procedure.

Reduction of the vitamin A acid esters to vitamin A alcohol is readily effected by treating the esters with an ether-soluble metal hydride as described hereinabove. If desired, the vitamin A alcohol can thereafter be esterified by treatment with a carboxylic acid or an acyl halide.

Preferred embodiments of the invention are illustrated by the following examples.

*Example 1*

Ninety-six grams of β-ionone, 96 g. of ethyl bromoacetate, 37.6 g. of zinc foil, 250 ml. of benzene, and a crystal of iodine were mixed together and refluxed until reaction began. The heat of reaction maintained reflux; and, when the evolution of heat ceased, the mixture was refluxed for an additional 30 minutes. The reaction mixture was cooled, shaken with an excess of 5% hydrochloric acid, and the benzene layer was separated and washed successively with water and dilute sodium carbonate solution. The benzene layer was then dried over sodium sulfate and the benzene removed by evaporation. The residue was distilled in a high vacuum still to give β-ionolacetic acid ethyl ester as a pale yellow viscous oil having $$E_{1\,cm.}^{1\%} (231\ m\mu) = 200$$

*Example 2*

A 14.8 g. portion of β-ionolacetic acid ethyl ester was dissolved in 65 cc. of benzene, a small crystal of iodine added and the mixture refluxed for 30 minutes. The benzene solution was washed successively with dilute sodium thiosulfate and water, dried and the solvent evaporated. After purification, the dehydration product had an absorption maximum at 284 mµ and comprised a mixture of α,β-unsaturated β-ionylidene acetic acid ethyl ester and the β,γ-unsaturated isomer thereof.

*Example 3*

Dehydration of β-ionolacetic acid ethyl ester and isomerization of part of the β,γ-unsaturated isomer formed in admixture with the desired α,β-unsaturated ester is illustrated by the following procedure. A 14.8 g. portion of β,ionolacetic acid ethyl ester was dissolved in 106 cc. of benzene and mixed with 0.5 cc. of phosphorous oxychloride dissolved in 42 cc. of benzene. The resulting mixture was refluxed for one hour, which was substantially longer than the reflux time necessary to effect dehydration alone. The mixture was then cooled, passed through 15 g. of sodium aluminum silicate adsorbent and the adsorbent washed with 100 cc. of benzene. After removal of the benzene under vacuum, the residue was dissolved in 100 cc. of petroleum ether and passed through a column (2″ x 20″) packed with finely divided sodium aluminum silicate. The column was then washed with 1800 cc. of petroleum ether and the ether collected, combined with the original filtrate, and evaporated, leaving 8 g. of β-ionylidene acetic acid ethyl ester having $$E_{1\,cm.}^{1\%} (256\ m\mu) = 450$$

and $$E_{1\,cm.}^{1\%} (304\ m\mu) = 552$$

The column was thereafter eluted with 1300 cc. of acetone to remove the adsorbed β,γ-unsaturated isomer of β-ionylidene acetic acid ethyl ester from the adsorbent. The acetone was evaporated off, leaving a residue of 6.5 g. of the β,γ-unsaturated isomer. This was dissolved in 35 cc. of benzene and 0.21 cc. of phosphorous exychloride in 30 cc. of benzene was added thereto. The mixture was refluxed for six hours, cooled, washed repeatedly with water, dried over sodium sulfate, filtered and the solvent removed by evaporation. The residue consisted of 6.4 g. of a mixture of β-ionylidene acetic acid ethyl ester and the β,γ-unsaturated isomer thereof. The residue was dissolved in 50 cc. of petroleum ether and passed through an adsorption column as before. After washing the column with 600 cc. of petroleum ether, the ether fractions were combined and the solvent evaporated to yield 3 g. of β-ionylidene acetic acid ethyl ester. Further recycling and retreatment of the β,γ-unsaturated isomer gives substantially complete recovery of α,β-unsaturated β-ionylidene acetic acid ethyl ester. Similar results are obtained with other dehydration and isomerization catalysts such as the mineral acids, phosphorous trichloride, iodine, p-toluene sulfonic acid, zinc chloride, acid clays, oxalyl chloride and similar materials exhibiting acidic characteristics under reaction conditions.

*Example 4*

The reduction of β-ionylidene acetic acid ester to β-ionylidene ethanol is readily effected by means of treatment with an ether-soluble metal hydride. For example, 4.6 g. of β-ionylidene ethyl acetate was dissolved in 60 ml. of dry ether and 50 cc. of a 0.4 N. ethereal solution of lithium aluminum hydride was added over a period of two minutes. The mixture was stirred for 5 minutes, diluted with 100 cc. of 5% hydrochloric acid, and the ether layer washed with water, dried with sodium sulfate and the solvent removed by evaporation. The residue of β-ionylidene ethanol weighed 4.0 g. and had $$E_{1\,cm.}^{1\%} (265\ m\mu) = 534\ (\text{in ethanol})$$

*Example 5*

The oxidation of β-ionylidene ethanol to β-ionylidene acetaldehyde was effected as follows. A 0.5 g. portion of β-ionylidene ethanol was dissolved in 3 cc. of dry benzene containing 0.75 g. of aluminum tert.-butoxide and 1 cc. of aniline. To the resulting mixture was added 2 cc. of diethyl ketone, and the mixture was heated under reflux at 110° C. for 16 hours. The reaction product was treated with 30 cc. of 5% hydrochloric acid, and extracted with ether. The ether extract was washed successively with dilute hydrochloric acid, 5% sodium bicarbonate solution and water. The ether extract was dried with sodium sulfate and the solvent removed by evaporation to give 0.48 g. of β-ionylidene acetaldehyde. After purification by chromatography, the product had $$E_{1\,cm.}^{1\%} (272\ m\mu) = 540$$

and $$E_{1\,cm.}^{1\%} (326\ m\mu) = 676$$

The 2,4 dinitrophenyl hydrazone of the aldehyde melted at 198–200° C. and had $$E_{1\,cm.}^{1\%} (405\ m\mu) = 990$$

Similar results are obtained with other aluminum or magnesium alkoxides, other primary aromatic amines, and other ketones.

*Example 6*

A particularly efficacious method of oxidizing β-ionylidene ethanol to β-ionylidene acetaldehyde involves the use of manganese dioxide as oxidizing agent. In a typical procedure, a 30 g. portion of β-ionylidene ethanol having a purity of 85%

$$(E_{1\,cm.}^{1\%} (267\ m\mu) = 516)$$

was dissolved in 300 cc. of methylene chloride. To the resulting solution was added 79 g. of finely powdered manganese dioxide prepared by the interaction of manganous sulfate and potassium permanganate. Oxidation of the β-ionylidene ethanol was effected by allowing the resulting mixture to stand for 22 hours at about 25° C. The mixture was then filtered to remove manganese dioxide and the solvent evaporated from the filtrate. The concentrate of β-ionylidene acetaldehyde obtained thereby weighed 27.9 g. and had $$E_{1\,cm.}^{1\%} (326\ m\mu) = 407$$

*Example 7*

The condensation of β-ionylidene acetaldehyde with an ester of β-methyl glutaconic acid was effected in the following manner. A reaction mixture was prepared by mixing together 5 g. of ethyl β-methyl-glutaconate, 5 g. of β-ionylidene acetaldehyde and 2.5 g. of potassium hydroxide dissolved in 100 ml. of methyl alcohol. The mixture was allowed to stand for two days at room temperature. Thereafter, the alcohol was distilled off under reduced pressure, the residue acidified with dilute hydrochloric acid and extracted with ether. The ether extract was washed with water and extracted successively with a 50 ml. and two 25 ml. portions of 8% sodium hydroxide. The extracts were combined, acidified with hydrochloric acid and the condensation product separated therefrom. In order to ensure substantially complete formation of diacid as the condensation product, the product of the condensation was saponified by refluxing for 45 minutes with 5.6 g. of potassium hydroxide in 16 ml. of water and 20 ml. of ethyl alcohol. Following saponification, the mixture was diluted, extracted with ether, and the extract acidified to give 7.4 g. of the α,γ-dicarboxy condensation product as a yellow solid. The diacid was crystallized from dilute alcohol and petroleum ether-acetone to give a pale yellow solid having a melting point of 186–189° C. and $$E_{1\,cm.}^{1\%} (333\ m\mu) = 810$$

*Example 8*

The condensation of β-ionylidene acetaldehyde with a β-methyl glutaconate ester is readily effected with any of the basic condensation catalysts. A typical example of the condensation using metallic sodium is as follows. To a solution of 1.7 g. of ethyl β-methyl-glutaconate in 15 cc. of anhydrous ether containing 0.5 cc. of ethyl alcohol was added 0.23 g. of metallic sodium. The resulting mixture was stirred for 1 hour, and a solution of 2.75 g. of β-ionylidene acetaldehyde (80% purity) dissolved in 10 cc. of ether was added. The resulting reaction mixture was stirred for 20 minutes, 1 cc. of glacial acetic acid was added thereto, and the mixture was poured into water and the ether layer separated out. The ether layer was then washed with N/2 potassium hydroxide solution and acidified. The acidified mixture was extracted with ether, the extract washed with water, dried and the ether evaporated from the extract. The residue was saponified with 2 N. potassium hydroxide and 1.35 g. of diacid was recovered. The diacid, after precipitation from an ethyl ether solution by the addition thereto of petroleum ether, was a yellow solid having $$E_{1\,cm.}^{1\%} (333\ m\mu) = 863$$

and a melting point of 186–189° C. as measured in the Fisher-Johns apparatus.

Similar results are obtained with other aliphatic or aromatic esters of β-methyl glutaconic acid. Other suitable catalysts include other alkali metals, alkali amines and the like. The basic catalyst can be employed to saponify at least a portion of the initial condensation product to the desired diacid although a subsequent saponification step is desirable for optimum yield.

*Example 9*

The α,γ-dicarboxy compound obtained by condensation of β-methyl glutaconate ester with β-ionylidene acetaldehyde can be decarboxylated by heating the diacid. Decarboxylation to the α-monocarboxy compound is desirably effected by heating in the presence of an organic base. In a typical process, decarboxylation to the monoacid was effected by heating a mixture of 3.4 g. of diacid and 12 ml. of quinoline for 40 minutes at 150–160° C. The mixture was then cooled, acidified and extracted with ether. The ether extract was in turn extracted with 4% aqueous sodium hydroxide, and the basic extract was acidified, giving a reddish-brown brittle glassy solid. This glassy solid was thereafter crystallized from alcohol to give reddish-brown prismatic crystals of monoacid having a melting point of 169–170.5° and $$E_{1\,cm.}^{1\%} (352\ m\mu) = 1280$$

*Example 10*

Optimum formation of the desired α-monocarboxy compound is achieved by decarboxylating the α,γ-diacid condensation product in the presence of a tertiary amine and powdered copper or a copper compound. A solution of 2.0 g. of α,γ-diacid condensation product $$(E_{1\,cm.}^{1\%} (333\ m\mu) = 863)$$

in 10 cc. of pyridine containing 0.1 g. of copper powder was refluxed for 1.5 hours. The solution was cooled, diluted with 50 cc. of ether, and washed successively with 5% hydrochloric acid, water, and one half normal potassium hydroxide. The alkaline extract was separated, acidified with dilute hydrochloric acid, and the monoacid extracted out with ether. The ether extract was washed, dried, and the ether removed by evaporation to give a residue which, after crystallization, had $$E_{1\,cm.}^{1\%} (353\ m\mu) = 1300$$

*Example 11*

To a solution of 0.5 g. of monoacid, as prepared in Example 10, in 50 cc. of anhydrous ether was added 4 cc. of a 1 N. ethereal solution of lithium aluminohydride. The solution was gently warmed to reflux for three minutes and the excess lithium aluminohydride was destroyed by the addition of dilute hydrochloric acid to the solution. After washing the ether solution successively with 5% hydrochloric acid, one half normal potassium hydroxide and water, the ether solution was dried, filtered and the ether removed by evaporation. The residual yellow oil comprising a vitamin A alcohol product weighed 0.47 g. and had $$E^{1\%}_{1\,cm.}\ (326\ m\mu) = 1125$$

Colorimetric assay with antimony trichloride showed a potency of 1,930,000 units of vitamin A per gram, this potency being confirmed by bioassay.

Example 12

It is desirable to effect the reduction to vitamin A alcohol from an ester of vitamin A acid rather than from the vitamin A acid itself. Esterification of the monoacid can be effected in accordance with conventional esterification procedures. Especially efficacious results from the standpoint of obviating isomerization as regards unsaturation are obtained by the following procedure. Ten grams of vitamin A monoacid concentrate was mixed with 48 cc. of methyl ethyl ketone, 6.7 cc. of ethyl bromide, 2.4 g. of potassium carbonate and 0.03 g. of sodium iodide. The mixture was refluxed for 4 hours at 70–75° C. The methyl ethyl ketone was removed from the mixture by evaporation and the carbonate decomposed by the addition of dilute hydrochloric acid. The ethyl ester of the monoacid was extracted out with isopropyl ether and recovered by evaporation of the ether.

Example 13

Ten grams of the ethyl ester of the monoacid were dissolved in 38 cc. of anhydrous ethyl ether and to the resulting solution was slowly added 1.2 g. of lithium aluminohydride dissolved in 65 cc. of anhydrous ether. Within five minutes of the start of addition of the metal hydride, the reaction mixture was diluted with water to destroy excess metal hydride. The reaction product was then washed successively with dilute hydrochloric acid, 4% aqueous sodium bicarbonate and water. The vitamin A alcohol concentrate obtained as product assayed 1,650,000 units of vitamin A per gram.

Example 14

The α-monoacid product prepared by decarboxylating the α,γ-dicarboxy condensation product is desirably treated to convert at least a portion of the cis-vitamin A acid to trans-vitamin A acid. A typical process for effecting the isomerization was as follows. A 0.25 g. portion of monoacid decarboxylation product, as prepared in Example 10, was dissolved in 50 cc. of benzene containing 0.3 mg. of iodine. The solution was exposed to sunlight for 3 hours at room temperature and then filtered through a column of finely-powdered sodium thiosulfate to remove the iodine. The solvent was removed from the filtrate by evaporation, and the residue obtained thereby had $$E^{1\%}_{1\,cm.}\ (240\ m\mu) = 248$$

and $$E^{1\%}_{1\,cm.}\ (350\ m\mu) = 1510$$

corresponding to 26.4% of the trans form of vitamin A acid.

Example 15

The isomerization of cis to trans vitamin A is desirably carried out employing an ester of cis-vitamin A alcohol. Esters are readily prepared by reacting cis-vitamin A alcohol with an acyl halide such as acetyl chloride, palmityl chloride or the like. The isomerization is effected in a typical process by refluxing the cis ester in an organic solvent such as naphtha. The isomerization proceeds more rapidly employing a trace of acid or iodine as isomerization catalyst. For example, 1 g. of a concentrate of cis-vitamin A palmitate having $$E^{1\%}_{1\,cm.}\ (328\ m\mu) = 615$$

was dissolved in 10 cc. of benzene containing 2.5 mg. of dissolved iodine. The solution was allowed to stand for 45 minutes at room temperature, and thereafter the iodine was removed by passing the solution through sodium thiosulfate and the solvent was removed by evaporation. Chemical assay showed the residue to contain a 68:32 ratio of trans-vitamin A palmitate to cis-vitamin A palmitate. The procedure was repeated employing 5 mg. of iodine and a reaction period of 2 hours. The trans- to cis- ratio in the product was 88:12.

Example 16

Isomerization of cis compound to trans compound can also be effected with the cis-vitamin A alcohol. A solution of 0.5 g. of cis-vitamin A alcohol in refined cottonseed oil was dissolved in 2 cc. of benzene containing 0.2 mg. of iodine. The mixture was allowed to stand for 2 hours at room temperature, the iodine removed with sodium thiosulfate and the solvent removed by evaporation. Chemical assay showed a trans-vitamin A alcohol to cis-vitamin A alcohol ratio of 82:18.

This invention thus provides a new and useful method of synthesizing vitamin A-active material in good yield.

While the invention has been described in detail with reference to certain preferred embodiments, it will be understood that variations and modifications can be effected within the spirit and scope of the invention as described hereinabove and as defined in the appended claims.

What we claim is:

1. The method of synthesizing vitamin A alcohol, which comprises, in combination, the sequential steps of condensing β-ionylidene acetaldehyde with an ester of β-methyl glutaconic acid in the presence of a basic condensation catalyst, and thereby forming the compound, vitamin A α,γ-diacid, heating said vitamin A α,γ-diacid with a mixture of an organic base and a copper compound at a temperature of 60–200° C. until said vitamin A α,γ-diacid is decarboxylated to vitamin A α-monoacid, and reducing said vitamin A α-monoacid to vitamin A alcohol with an ether-soluble metal hydride.

2. The method of synthesizing vitamin A alcohol, which comprises the combination of sequential steps of condensing β-ionylidene acetaldehyde with an ester of β-methyl glutaconic acid in the presence of a basic condensation catalyst, subjecting the resulting condensation product to additional saponification, and thereby forming the compound, vitamin A α,γ-diacid, decarboxylating said vitamin A α,γ-diacid to the corresponding vitamin A α-monoacid by heating said vitamin A α,γ-diacid at a temperature of 60–200° C. in admixture with a tertiary amine and a copper compound until carbon dioxide is evolved in an amount corresponding to decarboxylation of said vitamin A α,γ-diacid to said vitamin A α-monoacid, and reducing said vitamin A α-monoacid to vitamin A alcohol with an ether-soluble metal hydride.

3. The method of synthesizing vitamin A alcohol, which consists of the combination of sequential steps of condensing β-ionylidene acetaldehyde with an ester of β-methyl glutaconic acid in the presence of a basic condensation catalyst, subjecting the resulting condensation product to saponification in addition to that caused by said basic condensation catalyst, and thereby forming vitamin A α,γ-diacid, heating said vitamin A α,γ-diacid in admixture with tertiary amine and a copper compound at a temperature within the range of 60–200° C. until carbon dioxide is evolved in an amount sufficient for decarboxylation of said diacid to vitamin A α-monoacid, esterifying said vitamin A α-monoacid, and reducing the resulting ester of said vitamin A α-monoacid to vitamin A alcohol with lithium aluminum hydride.

4. The method of synthesizing vitamin A alcohol, which consists of the combination of sequential steps of condensing β-ionylidene acetaldehyde with an ester of β-methyl glutaconic acid in the presence of a basic condensation catalyst, subjecting the resulting condensation product to saponification in addition to that caused by said basic condensation catalyst, and thereby forming vitamin A α,γ-diacid, heating said vitamin A α,γ-diacid in admixture with a tertiary amine and a copper compound soluble in said tertiary amine, at a temperature of 90–175° C. until said vitamin A α,γ-diacid is decarboxylated to vitamin A α-monoacid, esterifying said vitamin A α-monoacid, and reducing the resulting ester of vitamin A α-monoacid to vitamin A alcohol with an ether-soluble metal hydride.

5. The method of synthesizing vitamin A alcohol, which comprises condensing β-ionylidene acetaldehyde with an ester of β-methyl glutaconic acid in the presence of a basic condensation catalyst, saponifying the resulting condensation product to form vitamin A α,γ-diacid, heating said vitamin A α,γ-diacid in admixture with a tertiary amine and a copper salt of a fatty acid at a temperature of 90–175° C., and thereby forming vitamin A α-monoacid, and reducing said vitamin A α-monoacid to vitamin A alcohol with an ether-soluble metal hydride.

6. The method of synthesizing vitamin A alcohol, which consists of condensing β-ionylidene acetaldehyde with a lower alkyl ester of β-methyl glutaconic acid in the presence of a basic condensation catalyst, subjecting the resulting condensation product to saponification in addition to that caused by said basic condensation catalyst, and thereby forming vitamin A α,γ-diacid, heating said vitamin A α,γ-diacid in admixture with a tertiary amine and copper acetate at a temperature of 90-175° C., and thereby forming vitamin A α-monoacid, esterifying said vitamin A α-monoacid, and reducing the resulting ester to vitamin A alcohol with lithium aluminum hydride.

References Cited in the file of this patent

UNITED STATES PATENTS

| | | |
|---|---|---|
| 2,233,375 | Kuhn | Feb. 25, 1941 |
| 2,369,158 | Milas | Feb. 13, 1945 |
| 2,381,882 | Cupery | Aug. 14, 1945 |
| 2,414,722 | Cornwell | Jan. 21, 1947 |
| 2,424,994 | Milas | Aug. 5, 1947 |
| 2,507,647 | Robeson et al. | May 16, 1950 |
| 2,515,901 | Schwartzkopf et al. | July 18, 1950 |
| 2,529,498 | Isler | Nov. 14, 1950 |
| 2,576,103 | Cawley et al. | Nov. 27, 1951 |
| 2,583,594 | Robeson | Jan. 29, 1952 |

OTHER REFERENCES

Adams: "Organic Reactions," vol. 1, John Wiley & Sons., N. Y. (1942), pp. 226–227.

Arens et al.: Nature, vol. 157, pp. 190–191 (1946), 2 pages.

Feist et al.: Beilstein, Handbuch (4th ed.), vol. 7, page 193 (1925) (1 p. only).

Heilbron: J. Chem. Soc. London, 1948, pp. 386–393.

Wendler et al.: J. American Chem. Society, vol. 73 pp. 719–724 (February 1951).